Nov. 20, 1934.  W. R. CHESLEY  1,981,221
APPARATUS FOR APPLYING SPRING COVERS TO SPRINGS
Filed April 10, 1931  3 Sheets-Sheet 1
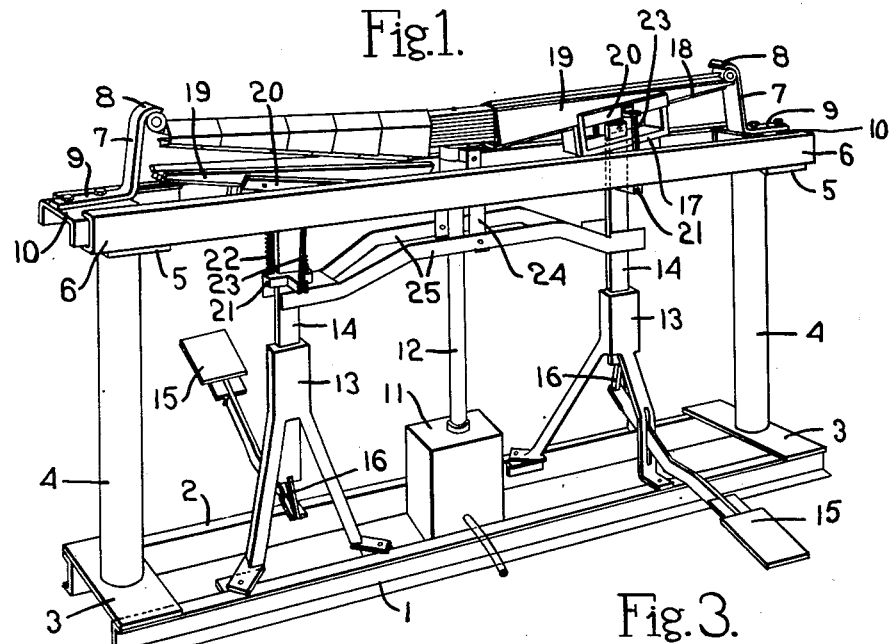
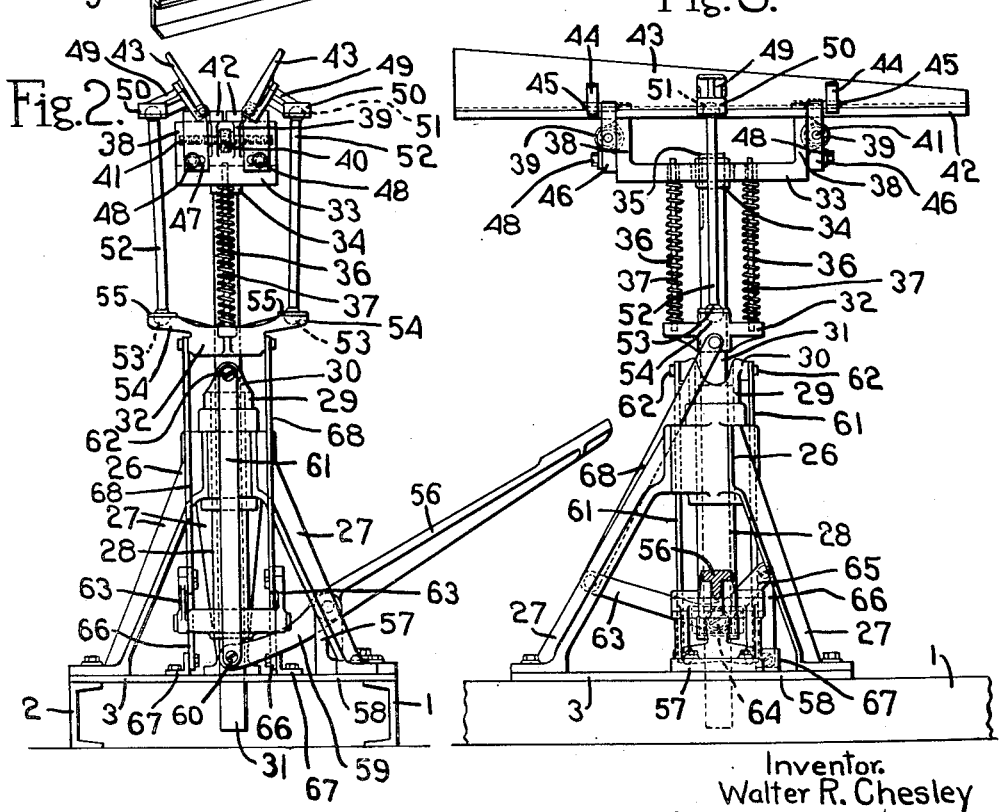
Inventor.
Walter R. Chesley
by Heard Smith & Tennant
Attys.

Nov. 20, 1934.  W. R. CHESLEY  1,981,221
APPARATUS FOR APPLYING SPRING COVERS TO SPRINGS
Filed April 10, 1931  3 Sheets-Sheet 2
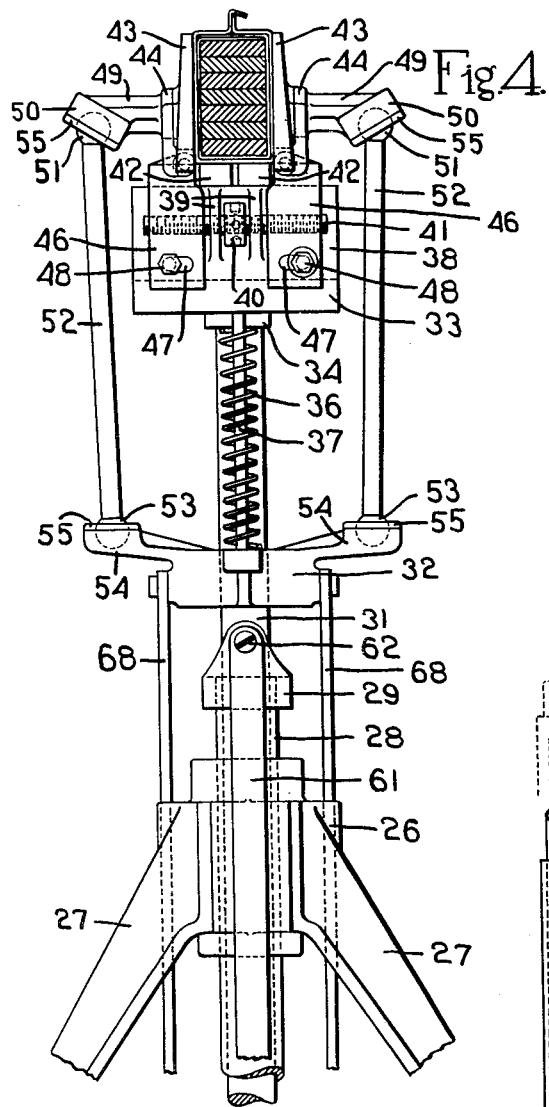
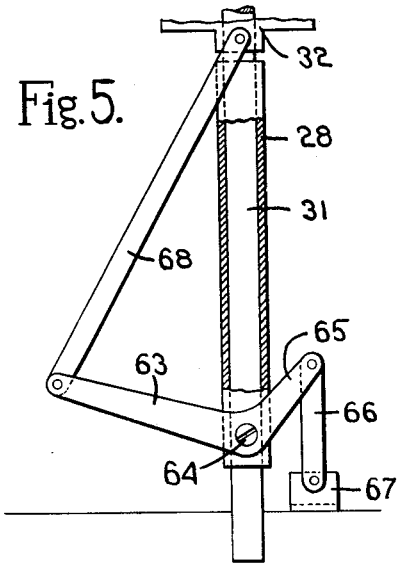
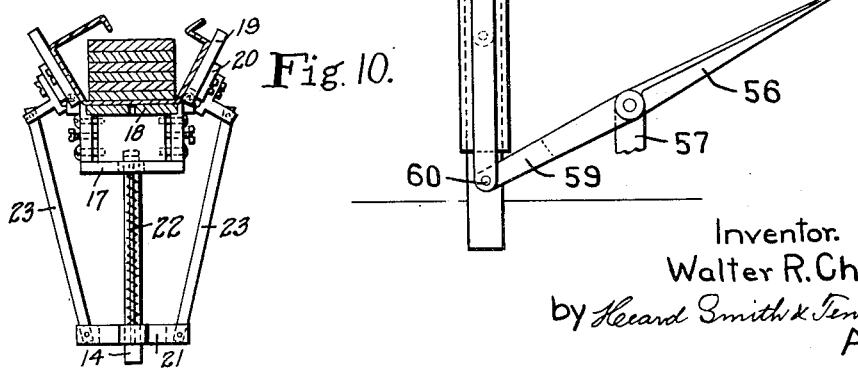
Inventor.
Walter R. Chesley
by Heard Smith & Tennant.
Attys.

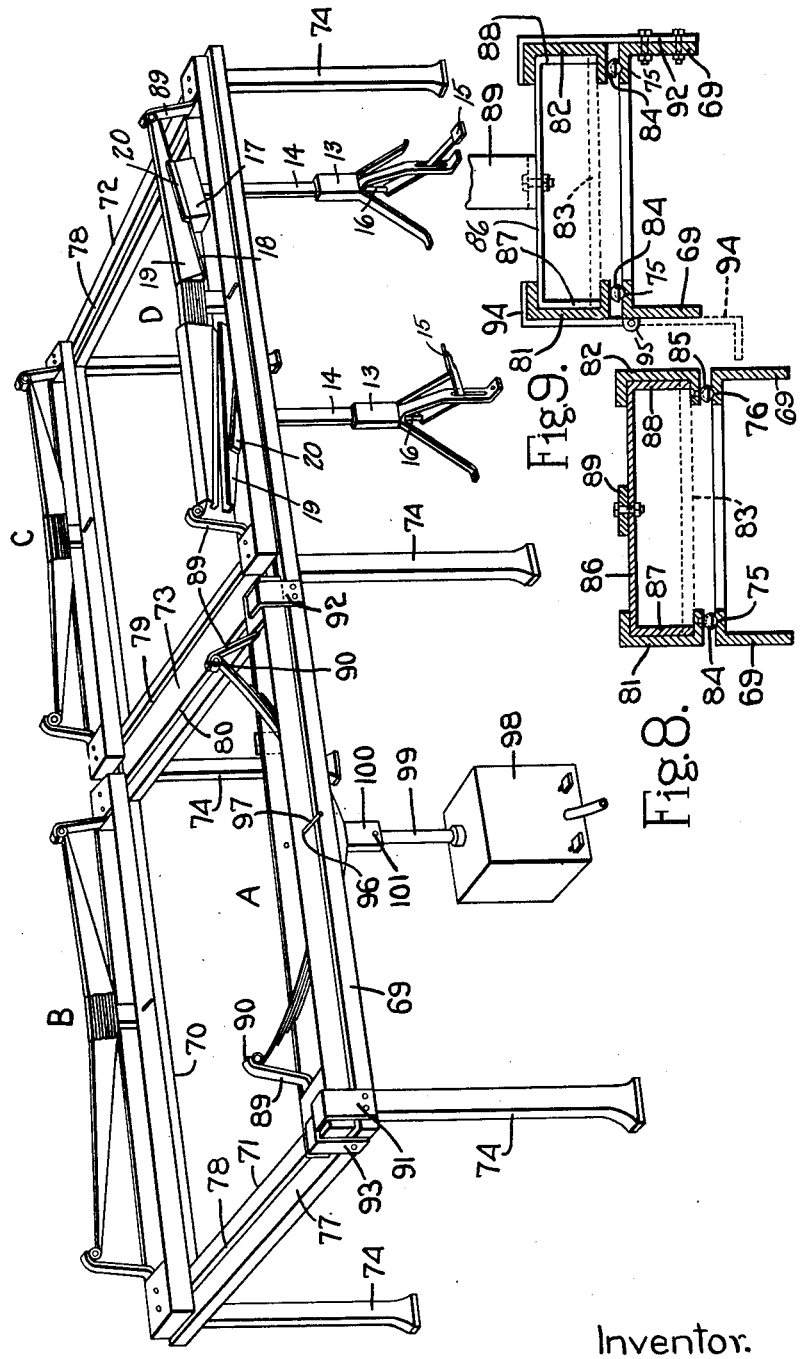

Patented Nov. 20, 1934

1,981,221

UNITED STATES PATENT OFFICE 1,981,221

APPARATUS FOR APPLYING SPRING COVERS TO SPRINGS

Walter R. Chesley, Somerville, Mass., assignor to Ajax Spring Stabilizer Company, Cambridge, Mass., a corporation of Illinois Application April 10, 1931, Serial No. 529,160

14 Claims. (Cl. 153—1)

This invention relates to improvements in apparatus for applying spring covers, of flexible material, to leaf springs of the cantilever or semi-elliptical type.

More particularly the invention is designed to apply to springs of these types sheet metal spring covers comprising fabricated, preferably tapering, units conforming to corresponding sections of the spring, and which units may or may not be connected together before application to the spring, and to clamp the spring cover units upon the lower face and sides of the spring in such manner that the free edges of the units may be interengaged and permanently locked upon the spring.

The apparatus is designed particularly to apply to springs, spring covers of the type disclosed in the patent to Schlesser, No. 1,648,742, granted November 8, 1927, or spring covers of this type in which the telescoping portions of the spring are so connected together that the spring cover may be applied as a unitary structure.

While the apparatus is adapted to apply spring covers to springs of the cantilever type, and to respective end portions of semi-elliptical springs in their normally curved position, it is particularly designed to apply the spring covers to semi-elliptical springs when the springs have been flexed to approximately straightened position, thereby enabling the cover to be more closely wrapped upon the spring, so that when the spring is permitted to resume its normal position the flexibility of the cover at the junction of the several units will cause it to conform closely to the spring.

One of the objects of the invention is to provide means for supporting the spring cover before application to the spring, with means operable to clamp the cover first upon the lower face of the spring and thereafter to bend and clamp the cover into engagement with the sides of the spring, thus enabling the end panels of the cover units to be bent down upon the upper face of the spring and the interengaging flanges thereof interlocked and bent downwardly to form a permanent locked seam.

Another object of the invention is to provide an apparatus comprising a cradle having preferably resilient means for engaging the ends of the spring, and means for applying power to the central portion of the spring to flex it into straightened position, in combination with means of the character above described for supporting the series of spring units, and movable first to clamp said units upon the under face of the spring, and thereafter to bend said units and clamp the same upon the sides of the spring.

A further object of the invention is to provide means for applying and clamping the spring cover upon the spring, having a vertical reciprocating power-transmitting member, a head yieldably mounted thereupon to clamp the cover against the lower face of the spring upon upward movement of said power-transmitting means, with means operable by continued movement of said power-transmitting member to bend and clamp the cover upon the sides of the spring.

Another object of the invention is to provide an apparatus for applying and clamping a cover upon a spring which comprises a track having a plurality of spring-treating stations, a cradle for supporting the spring in straightened position movable from one station to another, means being provided at one of said stations for straightening the spring, and means of the character above described being provided at another station for clamping the spring cover upon the spring.

A further object of the invention is to provide a rectangular frame having longitudinally extending side tracks, transverse end tracks, and transverse central tracks upon which the cradle may be moved longitudinally of the side tracks and laterally upon the transverse tracks to present the springs successively at a plurality of stations. Desirably one of said stations is provided with means for straightening the spring in the cradle from which the cradle may be removed transversely to another station for the application of lubricant to the spring, thence longitudinally of the side track to a third station to permit the application to the spring of the usual canvas wrapping, and transversely to a fourth station having means for clamping the cover upon the spring, at which station the cover may be locked upon the spring, and finally returning the spring to the first station at which the spring may be released and removed.

It will be obvious that by reason of this construction the application of spring covers to springs may be greatly facilitated as a sufficient number of workmen may be employed at the stations to perform the work required in a minimum time and with a minimum of physical exertion.

These and other objects and features of the invention will more fully appear from the following description and the accompanying drawings, and will be particularly pointed out in the claims.

Preferred embodiments of the apparatus are illustrated in the accompanying drawings, in which, Fig. 1 is a perspective view of a simplified form of apparatus for flexing a semi-elliptical spring into substantially straightened position, together with apparatus for clamping the spring covers upon the end sections of the spring;

Fig. 2 is an end view of a preferred form of apparatus for clamping the spring cover upon the bottom and sides of the spring;

Fig. 3 is a side view of the construction illustrated in Fig. 2, the power-applying lever being shown in section;

Fig. 4 is an enlarged end view similar to that disclosed in Fig. 2, showing the clamping members holding the bottom and sides of the spring cover against the under face and sides of the spring, and showing the manner in which the interengaging flanges of the cover snap into engagement with each other preparatory to the folding down of the flanges to form a locked seam;

Fig. 5 is a detail view illustrating the power-transmitting mechanism of the constructions shown in Figs. 2, 3, and 4, by which power uniformly applied is progressively increased during the clamping and bending of the cover;

Fig. 6 is a detail view illustrating the power-transmitting lever and the means for actuating a sleeve which in turn actuates the mechanism for progressively increasing the power transmitted to the clamping mechanism;

Fig. 7 is a perspective view of an apparatus comprising a rectangular frame having side tracks, transverse end tracks, and transverse central tracks, adapted to support cradles for the spring which are movable either longitudinally or transversely to different spring-treating stations, with means at one of said stations for straightening the spring in the cradle, and mechanism at another station for clamping the spring covers upon the spring; other stations being provided respectively to permit the application of lubricant to the spring, and the wrapping of a canvas cover upon the spring;

Fig. 8 is a transverse sectional view through the end portion of the cradle and the track illustrating a preferred anti-friction means for supporting the cradle upon the track to permit it to be moved longitudinally upon the side tracks or transversely upon the central and end tracks;

Fig. 9 is a transverse sectional view through the cradle and track at the spring-straightening station, illustrating means for preventing the cradle from being raised during the straightening of the spring; and Fig. 10 is an enlarged detail end view of the head and clamping members and means for actuating the same shown in Fig. 1, the spring and the plate which clamps the cover against the lower side of the spring being shown in section, and also illustrating in section the cover clamped upon the spring before the side members of the cover are folded against the spring.

The construction disclosed in Fig. 1 of the drawings comprises a frame having a base, preferably formed of channel bars 1 and 2 connected by transverse girders 3 upon which are mounted vertical posts 4. Transverse girders 5 are mounted upon the upper ends of the posts and support a cradle 6 formed of reversely arranged channel bars with the flanges of the channels extending toward each other, in one or both ends of which means are provided for supporting members to engage the ends of the spring.

The spring-engaging members illustrated are in the form of L-shaped resilient plates, one arm 7 of each of which is bent at its end to form a hook 8, and the other arm 9 bolted, or otherwise secured to a slide, preferably in the form of a short inverted channel bar, 10, mounted in ways formed by the flanges of the channel bars 6. By reason of this construction the slides may be adjusted to springs of different length, and will also move endwise such distances as may be required by the elongation of the spring as it is straightened. The resilience of the arms 7 insures proper holding of the spring during its elongation.

Any suitable means may be provided for straightening the spring. As illustrated herein, this is accomplished by providing a hydraulic motor 11, supplied from any suitable source of power (not shown) having a piston rod 12 adapted to engage the under face of the central portion of the spring and to force it upwardly, while the ends of the spring are retained from upward movement by the hook-shaped ends 8 of the spring-engaging members.

The mechanism for applying the spring cover to the spring comprises a stand 13 having a power-transmitting member 14 reciprocably mounted therein, and actuated by a pedal lever 15 which is fulcrumed upon one of the legs of the stand, with a suitable strut 16 at its opposite end flexibly connected at its ends to the shorter arm of the lever 15 and to the lower end of the power-transmitting member 14.

The power-transmitting member has yieldably mounted at its upper end a head 17 which is preferably provided with a plate 18 extending longitudinally of one of the end portions of the spring and preferably substantially of a length equal to the length of the spring cover. Wings 19 are detachably secured to hinge members 20 upon the head so that suitable wing members having a length and width corresponding to those of different spring covers may be substituted as may be required. Preferably means are provided for enabling the hinge members to be adjusted laterally to enable the head to be employed for the purpose of clamping covers upon springs of different widths.

As illustrated more particularly at the left side of Fig. 1, the power-transmitting member 14 has secured to it a cross head 21 upon which are mounted upwardly extending rods forming guides for spiral springs 22, the upper ends of which engage the under surface of the head 17. The hinge members 20 of the wings are provided with lateral projections to which the upper ends of struts 23 are flexibly mounted as by a ball and socket joint, the lower ends of the struts 23 being connected by a ball and socket joint to the cross head 21.

In the operation of the device, therefore, the spring cover, the sections of which are bent to conform to corresponding sections of the spring with complementary flanges forming interlocking members at the edges of the springs, is placed upon the plate 18 in partially opened position, that is, with the ends of the spring cover separated sufficiently to pass upwardly along the sides of the spring. When thus positioned the pedal 15 is depressed, thereby raising the power-transmitting member 14 and causing the head 17 to force the spring cover firmly against the under face of the spring. Upon continued movement of the power-transmitting member by further depression of the pedal, the power-transmitting member will continue to be moved upwardly against the resistance of the spring 22. Such upward movement, however, will cause the cross head to be raised further, and thereby to cause the struts 23 to swing the wings 19 inwardly, thereby bending the cover against the sides of the spring, so that the end panels of the spring cover will overlie the upper face of the spring and the complementary flanges at the edges of the spring cover brought into engagement with each other, so that they can be readily interengaged and then folded or hammered down to secure the spring cover upon the spring by a locked seam.

In view of the fact that a very considerable movement of the head is required in view of the straightening of the spring, means operable by the spring-straightening mechanism may be provided for raising the head 17 a part of such distance. In the particular construction illustrated, rigid links 24 are secured to the head of the plunger 12, which engages the central part of the spring, and are connected at their lower ends to bars 25 which are adapted to engage the under faces of the cross heads 21, so that as the piston rod 12 is raised to straighten the spring, the cross heads 21 and consequently the heads 17 will be raised a part of the distance toward the straightened spring. When the piston has reached the upper limit of its movement, the head, while located in proximity to the spring, is at a sufficient distance therefrom to enable the spring cover to be placed in the head. After the spring cover has been so located, the head may be raised further by depression of the actuating lever or pedal 15 to clamp the cover upon the lower face of the spring and thereafter to bend and clamp the cover upon the sides of the spring in the manner above described.

A preferred construction for applying and clamping the spring cover upon the spring, in which continuous application of substantially the same power produces a progressively increasing clamping force upon the head and wings, is illustrated in Figs. 2 to 6 inclusive, and it will be understood that such mechanism may be employed in combination with the spring-holding and straightening mechanism, shown in Fig. 1, in place of the simpler form of cover-applying mechanism illustrated therein.

The spring-applying and clamping mechanism illustrated in Figs. 2 to 6 inclusive comprises a stand 26 having legs 27 mounted upon the channel bars 1 and 2 of the base. A vertical sleeve 28 is reciprocably mounted in the upper cylindrical portion of the stand and is provided with an enlarged head 29 having a pair of upwardly extending ears 30. A guide rod or bar 31, which is reciprocably mounted in the sleeve, has secured to it a cross head 32. A channel-shaped head 33, corresponding to the head 17, is slidably mounted on a bushing 34 in the lower wall of the head, and the upper end of the guide rod is provided with a flanged portion 35 adapted to engage the upper end of the sleeve to prevent removal of the head from the guide rod. The head 33 is normally supported against the flange 35 of the guide rod by springs 36 interposed between the under face of the head 33 and the cross head 32. Rods 37, extending axially through the springs and reciprocably mounted in suitable bearings in the lower wall of the head, prevent buckling of the springs during compression. The central portion of the upwardly extending flanges 38 of the head desirably is provided with a pair of outwardly extending ears 39 between which a nut 40, which is pinned to an adjusting screw 41, is confined. Longitudinally extending plates or bars 42 rest upon and are detachably secured to the upper edges of the flanges, these bars being of a length preferably corresponding to the length of the spring cover to be applied.

Wings 43, for bending and clamping a cover to the sides of the spring, are pivotally mounted upon the head and desirably are adjustable laterally relatively to each other to correspond to different widths of leaf springs. In the preferred construction illustrated the wings 43 are provided with bosses 44 which are secured by removable pintles 45 to brackets 46 having at their lower ends slots 47 through which clamping screws 48 extend into the flanges 38 of the head. The flanges 38 are bored transversely and threaded to receive the adjusting screw 41. The brackets may, therefore, be adjusted simultaneously laterally by releasing the bolts 48 and then rotating the nut 40 to position the wings properly with respect to a spring of any width. When this adjustment is accomplished, the clamping screws 48 are set up to hold the brackets firmly in such adjusted position. The bosses 44 upon the wings 43 are provided with outwardly projecting extensions 49 having heads 50 provided with cylindrical sockets to receive the spherical ends 51 of struts 52, the lower ends of which are provided with similar spherical ends 53 seated in complementary sockets in the arms 54 of the cross head 32. The spherical ends 51 and 53 of the struts 52 desirably are held in sockets by plates 55 embracing the spherical ends above the maximum diameter thereof.

When the head is in normal position to receive the fabricated spring cover,—when the latter is in opened position to be applied to the springs,— the head 33 will be forced upwardly by the spring 36 until it engages the flange 35 upon the guide rod. The lengths of the struts 52 are such that when the head is thus positioned, the wings will be swung into open position illustrated in Fig. 2.

When the cross head is forced upwardly into clamping relation with the spring, the plates 42, upon which the spring cover rests, will first clamp the spring cover against the lower face of the spring. Upon further upward movement of the cross head the springs 36 will be compressed and the struts 52 will then swing the wings about pivotal axes located in proximity to the lower edges of the spring, thereby bending the cover into engagement with the sides of the spring and clamping the cover upon such side edges. The edge portions or panels of the cover may then be pressed or hammered down firmly into engagement with the top of the springs and the complementary edge flanges interengaged and bent down to form a locked seam.

Any suitable means may be provided for actuating the cross head, such as that illustrated in Fig. 1. Such means, however, as is shown in Figs. 2 to 6 inclusive, comprises means for progressively increasing the power applied to the head and to the wings as the cross head is raised. In this construction the power-applying means comprises an operating lever 56, preferably a pedal lever, fulcrumed upon an L-shaped bracket 57 secured to the base plate 58 of the stand, the lever being provided with shorter forked arms 59, each of which is connected by a pivot 60 to the lower end of a link 61, (see Figs. 2 and 6), the upper end of the link 61 being connected by pivots 62 to the ears 30 which extend upwardly from the head 29 of the sleeve 28, so that by the depression of the pedal lever 56 the sleeve is moved upwardly through its bearing in the head of the stand 26.

This movement of the sleeve is utilized to move the cross head through suitable mechanism for progressively increasing the power applied to the cross head and it also serves to move the cross head to a greater distance than the distance to which the sleeve is moved. In the construction illustrated, bell crank levers 63, (see Figs. 3 and 5), are mounted upon pivots 64 secured to the sleeve 28, and the shorter arm 65 of each bell-crank lever is connected by a link 66 to a block 67 which is rigidly secured to the base plate 58 of the stand. The opposite end of the longer arm of each bell crank lever 63 is connected by a link 68 to the cross head 32, or to the guide rod 31.

By reason of this construction, therefore, depression of the operating lever 56 will raise the sleeve, thereby raising the fulcrum 64 of the bell crank lever, and inasmuch as the shorter end of the bell crank lever is rigidly connected to the base, the longer arm of the bell crank lever will be swung upwardly toward the vertical axis of the sleeve, thereby forcing the link 68 upwardly and raising the cross head 32. This upward swinging movement of the long arm of the bell crank lever progressively shortens its effective length and increases the power applied to the cross head, at the same time imparting to the cross head a more rapid upward movement than that of the sleeve.

The clamping head 33 will be raised easily into engagement with the under surface of the spring, and further movement of the sleeve will therefore force the cross head upwardly, compressing the springs 36, thus maintaining the spring cover clamped upon the spring by the head 33, while the further movement of the cross head will, with increasing force due to the shortening of the effective length of the longer bell crank arm, swing the wings toward vertical position, and finally into clamping engagement with the sides of the spring, thereby clamping the cover upon three sides of the spring and permitting it to be applied and locked upon the fourth side of the spring in the manner above described.

In the application of metal spring covers to springs it is the usual practice to coat the spring with a lubricant which will prevent such interleaf friction as to cause squeaking of the springs, and it is also desirable to enclose the lubricated spring in a cover of fabric, duck, felt, or other suitable material, before the spring cover is applied. One of the objects of the present invention is to provide a construction comprising a series of stations, "A", "B", "C", and "D", at one of which, "A", a semi-elliptical spring may be compressed and straightened in a movable cradle, the cradle then being moved to a second station, "B", at which the lubricant may be applied, thence moved to a third station, "C", at which the fabric cover may be applied to the spring, and thence moved to a fourth station "D", at which the cover may be clamped and locked upon the spring, and thence moved to the first station, "A", to permit the release of the spring from compression and its removal from the cradle. Such a mechanism is illustrated in Fig. 7 of the drawings, in which the means for straightening the spring and means for applying the cover to the spring, preferably of the character above described are illustrated.

The apparatus illustrated in Figs. 7, 8, and 9, comprises a rectangular frame having parallel side tracks 69 and 70 connected by transverse end tracks 71 and 72, and also connected by a central girder 73 providing two tracks for the transverse movement of the cradle. The frame is supported in any suitable manner as upon posts 74. The side bars 69 desirably are constructed of structural bars, such as angle irons, the horizontal flanges of which are provided with grooves 75 and 76 to receive suitable anti-friction casters upon the cradle. The angle bars are spaced apart a sufficient distance to permit the heads of the cover-applying mechanism to pass freely between them. The transverse tracks desirably are formed of inverted channel bars 77 having longitudinally extending central grooves 78 communicating with the grooves 75 and 76, and forming guides for the casters upon the crandle. The central transverse girder 73 may be of angle bar construction, but desirably is of inverted channel bar construction, and is provided with two longitudinally extending guiding grooves 79 and 80 forming guides for the casters of the cradle, and communicating with the grooves 75 and 76. By this construction the cradle is enabled to be moved either longitudinally of the side bars or transversely from one side bar to the other.

The cradle desirably is constructed of reversely arranged channel bars 81 and 82 suitably connected together as by end plates 83 secured to the lowe flanges of the channels 81 and 82, and the lower flanges of the channels are provided with ball casters 84 and 85 adapted to traverse the guiding groove of the side and transverse tracks.

The spring-supporting members desirably are in the form of short inverted channel bar slides 86, the flanges 87 and 88 of which are reciprocably mounted in the channel bars 82 of the cradle. L-shaped resilient members 89 are bolted, or otherwise secured to the central portion of the lower or upper face of the slides 86, and are provided with hooked ends 90 to engage the ends or eyes of the spring.

By reason of this construction the slides may be moved endwise to accommodate the elongation of the spring as it is straightened, and the resilient hook-shaped members will insure proper engagement with the ends of the spring.

Any suitable means may be provided for holding the cradle upon the track when it is positioned at station "A" at which the spring is elongated. In the construction illustrated L-shaped plates 91 and 92 are bolted, or otherwise secured to the side track 69, with their horizontal flanges overlying the ends of the cradle when it is positioned at station "A" for the straightening of the spring. A similar L-shaped plate 93 is secured to the transverse track 77 to overlie the end of the cradle when positioned at station "A". If desirable other means may be employed for preventing the tilting of the opposite end of the cradle when it is at the spring-straightening position "A".

A convenient construction, which is illustrated in Fig. 9, comprises an L-shaped plate 94, which is pivotally mounted upon lugs 95 upon the rear wall of the side frame, so that it may be swung into the position illustrated in full lines in Fig. 9 to overlie the channel bar 81 of the cradle, or swung to the position indicated in dotted lines to permit the cradle to be moved along the transverse tracks.

The cradle is provided with suitable means for locking the spring in straightened position. A convenient mechanism, which is illustrated herein, comprises apertures 96 in the webs of the channel bars 81 and 82 of the frame adapted to receive a pin 97 which may be inserted beneath the spring after it has been straightened.

Any suitable means may be provided for straightening the spring, such as a hydraulic motor 98 having a piston 99 provided with a detachable head 100 having an aperture 101 through which the pin 97 may be inserted to hold the spring in its straightened position in the cradle, as illustrated at stations "B", "C", and "D", respectively.

The station "D" at which the spring cover is applied to the spring is provided preferably with a pair of cover-applying members of any suitable type, those illustrated in Fig. 7 being similar in construction to those shown in Fig. 1, and previously described, so that further description of the cover-applying mechanism is unnecessary.

In the operation of the device the central portion of the spring is placed upon the head 100 of the hydraulically operated piston 99 with its ends beneath the hooked end portions 90 of the spring-engaging plates 89. Power is then applied to the hydraulic motor and the piston thereof moved upwardly until the spring assumes a substantially straight position. The pin 97 is then inserted beneath the central portion of the spring, preferably through the aperture 101 in the detachable head 100, and the piston rod of the hydraulic motor lowered, so that the straightened spring is supported in the cradle. Upward movement of the cradle is prevented during the straightening of the spring by the overlying flanges of the L-shaped members 91 and 92, and 93, and the hinged L-shaped member 94.

When the spring is straightened and locked in such position in the cradle by the insertion of the pin 97, the head 100 is removed from engagement with the spring by the lowering of the piston 99. The cradle may then be moved laterally across the transverse tracks to the opposite side track 70 and positioned at station "B" where lubricant is applied. The cradle is then moved endwise to station "C" at which the fabric cover is wrapped upon the spring. The cradle is then moved transversely to station "D" at which the spring covers are applied to the springs in the manner above described; and finally, the cradle is moved lengthwise of the side track 69 to station "A" whereupon the hydraulic motor is again actuated to cause its piston 99 to engage the head 100, which supports the central portion of the spring, and raise it sufficiently to permit the withdrawal of the pin 97, so that upon lowering of the piston, the spring may be removed and another spring substituted.

It will be understood that various changes in form, construction and arrangement of parts, or utilization of other mechanisms for straightening the spring or applying spring covers thereto, may be made within the spirit and scope of the following claims.

Having thus described the invention, what is claimed as new, and desired to be secured by Letters Patent, is:

1. Apparatus for applying spring covers to springs comprising a stand, a power-transmitting member reciprocably mounted therein, means for actuating the same, a head yieldably mounted upon said power-transmitting member having clamping means to engage the cover throughout its length beneath the spring, wings pivotally mounted upon said head to swing about axes extending in substantial parallelism with and in proximity to the lower edge of the spring, and means connecting said wings to said power-transmitting member operable by continued movement of the latter after said clamping means is moved into clamping relation with the spring to fold and clamp the cover upon the sides of the spring.

2. Apparatus for applying spring covers to springs comprising a stand, a power-transmitting member reciprocably mounted therein, means for actuating the same, a head yieldably mounted upon said power-transmitting member having clamping means to engage the cover throughout its length beneath the spring, wings pivotally mounted upon said head to swing about axes extending in substantial parallelism with and in proximity to the lower edge of the spring, means for adjusting the pivotal supports for said wings laterally relatively to each other to correspond to different widths of springs, and means connecting said wings to said power-transmitting member operable by continued movement of the latter after said clamping means is moved into clamping relation with the spring to fold and clamp the cover upon the sides of the spring.

3. Apparatus for applying spring covers to springs comprising a stand, a power-transmitting member reciprocably mounted therein, means for actuating the same, a head yieldably mounted upon said power-transmitting member having clamping means to engage the cover throughout its length beneath the spring, wings pivotally mounted upon said head to swing about axes extending in substantial parallelism with and in proximity to the lower edge of the spring, and removable to permit the use of other wings corresponding to the sides of springs of different lengths and thickness, and means connecting said wings to said power-transmitting member operable by continued movement of the latter after said clamping means is moved into clamping relation with the spring to fold and clamp the cover upon the sides of the spring.

4. Apparatus for applying spring covers to springs comprising a cradle for supporting the spring, a stand therebeneath, a sleeve reciprocable in said stand, a guiding member reciprocably mounted in said sleeve, a clamping head slidably mounted upon said guiding member having means to clamp the cover upon the lower face of said spring and provided with pivotally mounted wings for folding the cover against the sides of the spring, a cross head mounted upon said guiding member, resilient means intermediate of said cross head and said clamping head, wing-actuating struts pivotally connected to said cross head and to said wings, means for actuating said sleeve, and mechanism connecting said sleeve and said cross head operable by the upward movement of the sleeve first to cause the head to clamp the cover upon the lower face of the spring and then to swing the wings into clamping relation to the sides of said spring.

5. Apparatus for applying spring covers to springs comprising a cradle for supporting the spring, a stand therebeneath, a sleeve reciprocable in said stand, a guiding member reciprocably mounted in said sleeve, a clamping head slidably mounted upon said guiding member having means to clamp the cover upon the lower face of said spring and provided with pivotally mounted wings for folding the cover against the sides of the spring, a cross head mounted upon said guiding member, resilient means intermediate of said cross head and said clamping head, wing-actuating struts pivotally connected to said cross head and to said wings, a bell crank lever fulcrumed upon said sleeve having a short arm connected by a link to said stand, and a long arm connected by a link to said cross head, and means for actuating said sleeve whereby said head will first clamp the cover upon the lower face of the spring and continued movement of the sleeve will cause said wings to clamp the cover upon the sides of the spring.

6. Apparatus for applying spring covers to springs comprising a cradle for supporting the spring, a stand therebeneath, a sleeve reciprocable in said stand, a guiding member reciprocably mounted in said sleeve, a clamping head slidably mounted upon said guiding member having means to clamp the cover upon the lower face of said spring and provided with pivotally mounted wings for folding the cover against the sides of the spring, a cross head mounted upon said guiding member, resilient means intermediate of said cross head and said clamping head, wing-actuating struts pivotally connected to said cross head and to said wings, a bell crank lever fulcrumed upon said sleeve having a short arm connected by a link to said stand, and a long arm connected by a link to said cross head, a lever fulcrumed upon said stand having a short arm connected by a link to said sleeve operable to raise said sleeve and thereby cause said head first to clamp the cover upon the lower face of said spring and upon continued movement to cause said wings to clamp the cover upon the sides of the spring.

7. Apparatus for applying spring covers to semi-elliptical leaf springs comprising a cradle having members to engage the ends of the spring, power-applying means to engage the central portion of the spring operable in co-operation with said end-engaging means to flex the spring to approximately straight position, and means for clamping the cover upon the bottom and sides of the spring while the latter is in straightened position.

8. Apparatus for applying spring covers to leaf springs comprising a cradle having members to engage the ends of the spring, power-applying means to engage the central portion of the spring operable in co-operation with said end-engaging members to flex the spring to approximately straight position, a head having clamping and bending means, and actuating means operable to raise said head first to clamp the cover upon the lower face of the spring, and then bend and clamp the cover upon the sides of the spring.

9. Apparatus for applying spring covers to leaf springs comprising a cradle having members to engage the ends of the spring, power-applying means to engage the central portion of the spring operable in cooperation with said end-engaging members to flex the spring to approximately straight position, a head having clamping and bending means, means operable by said power-applying means during the straightening of the spring to raise said head toward said spring, and manually operable means for causing said head first to clamp a cover upon the lower face of the spring and thereafter to bend and clamp the cover upon the sides of the spring.

10. Apparatus for applying spring covers to semi-elliptical leaf springs comprising a track having a plurality of stations, a cradle mounted on said track and movable from one station to another, having means for supporting and locking the spring in approximately straightened position, means at one of said stations for preventing vertical movement of said cradle, power-applying means at said station for straightening said springs, and means at another station operable to clamp the cover upon the lower face and sides of the spring.

11. Apparatus for applying spring covers to semi-elliptical leaf springs comprising a track having a plurality of stations, a cradle mounted on said track and movable from one station to another, provided with resilient hook members to engage the ends of the spring and with releasable means to lock the spring in approximately straightened position, means at one of said stations for preventing vertical movement of said cradle, power-applying means at said station for straightening said spring, and means at another station operable to clamp the cover upon the lower face and sides of the spring.

12. Apparatus for applying spring covers to semi-elliptical leaf springs comprising a rectangular frame having longitudinally extending side tracks, transverse end tracks, and transverse central tracks providing a plurality of spring treating stations, a cradle, having means to engage the ends of the spring and releasable means for locking the spring in straightened position, movable longitudinally upon the side tracks or laterally upon the transverse tracks selectively to present the springs at the several stations, means at one of said stations for flexing the spring to approximately straightened position, and means at another station operable to clamp the spring cover upon the lower face and sides of the spring.

13. Apparatus for applying spring covers to semi-elliptical leaf springs comprising a rectangular frame having longitudinally extending side tracks, transverse end tracks, and transverse central tracks providing a plurality of spring-treating stations, a cradle having means to engage the ends of the spring, and means detachably to lock the spring in straightened position, and provided with anti-friction bearings reciprocably mounted upon said tracks and movable longitudinally upon said side tracks and transversely upon said transverse tracks to position the springs successively at said stations, power-applying means at one of said stations operable to flex the spring to straightened position, and means at another station operable to clamp the spring cover upon the lower face and sides of the spring.

14. Apparatus for applying spring covers to semi-elliptical leaf springs comprising a rectangular frame having longitudinally extending side tracks, transverse end tracks, and transverse central tracks providing a plurality of spring-treating stations, grooves extending longitudinally of said side tracks, grooves extending longitudinally of said transverse tracks communicating respectively with the grooves in said side tracks, a cradle having resilient hook members to engage the ends of the spring, and a releasable pin detachably to engage the central portion of the spring and lock the same in straightened position, casters on said cradle engaging said groove and operable to permit the cradle to move longitudinally or transversely of the frame to present the springs successively at said stations, means at one of said stations to engage the cradle and prevent the raising thereof, power-applying means at said station operable to straighten the spring, and means at another station operable to apply the spring cover to the spring and to clamp it successively upon the lower face of the spring and upon the sides of the spring.

WALTER R. CHESLEY.